United States Patent [19]

Gräff

[11] Patent Number: 5,215,555

[45] Date of Patent: Jun. 1, 1993

[54] METHOD AND APPARATUS FOR ADSORBING MOISTURE FROM GASES, ESPECIALLY AIR

[76] Inventor: Roderich Gräff, 607 Church St., Ann Arbor, Mich. 48104

[21] Appl. No.: 869,247

[22] Filed: Apr. 15, 1992

Related U.S. Application Data

[63] Continuation-in-part of Ser. No. 678,885, Mar. 27, 1991, abandoned, which is a continuation of Ser. No. 468,228, Jan. 22, 1990.

[51] Int. Cl.$^5$ .............................................. B01D 53/04
[52] U.S. Cl. ........................................... 55/20; 55/33; 55/163; 55/270
[58] Field of Search ........................ 55/20, 21, 33, 163, 55/179, 270, 389; 34/80

[56] References Cited

U.S. PATENT DOCUMENTS 4,197,095  4/1980  White et al. ............................ 55/20
4,504,286  3/1985  Carlisle et al. ......................... 55/20

Primary Examiner—Charles Hart
Attorney, Agent, or Firm—Michael J. Striker

[57] ABSTRACT

The method of controlling a duration of an adsorption cycle in a process of adsorbing moisture from a gas, particularly air, using an adsorbing material including the steps of passing a moisture-carrying gas and a heated regenerating medium alternatingly through the adsorbing material in a series of alternating adsorption cycles and regeneration cycles, consists of monitoring, during a regeneration cycle, only a decrease of weight of the adsorbing material; comparing the decrease in weight of the adsorbing material to a preset value; and controlling the duration of an adsorption cycle immediately following the regeneration cycle according to the comparing. Alternatively, the method of controlling the duration of the adsorption cycle consists of monitoring, during an absorption cycle, only an increase of weight of the adsorbing material; comparing the increase in weight of the adsorbing material during the monitoring to a preset value; and switching to regeneration when the preset value is reached.

8 Claims, 2 Drawing Sheets

METHOD AND APPARATUS FOR ADSORBING MOISTURE FROM GASES, ESPECIALLY AIR

This application is a continuation-in-part of application Ser. No. 678,885, filed Mar. 27, 1991, now abandoned, which in turn is a continuation under rule 1.62 of application Ser. No. 468,228, filed Jan. 22, 1990, now abandoned.

BACKGROUND OF THE INVENTION

The present invention relates to a process and apparatus for adsorbing moisture from gases, particularly air, and, more particularly, to a method of controlling a duration of an adsorption cycle in the process for adsorbing moisture from gases.

German Published Patent Application 36 25 013 discloses utilization of dried air for drying bulk material, particularly plastic granulates. The dried air is fed through the bulk material dropping through a drying container under gravity in a reverse flow. The moisture carried with the exhaust air from the drying container is removed from the exhaust air by a moisture-adsorbing material. After a fixed time period the moisture-adsorbing material with this moisture is separated and is regenerated by a hot regeneration medium, mostly hot air, during a regeneration cycle. Usually the duration of adsorption is determined according to the maximum load of moisture which the adsorbing material, mostly molecular sieve, may hold. The greatest possible quantity of moisture from the gas to be dried should be adsorbed during the adsorption period, and the dried air again supplied to the drying container should have a low dew point.

When the drying container is run with maximum throughput through the bulk material to be dried, the exhaust air drying apparatus explained above operates with high efficiency. However, in case the moisture load of the exhaust air decreases, e.g. because the throughput through the drying container is reduced or because the bulk material contains less moisture, the adsorbing material within a drying pot is regenerated after a fixedly set adsorption period although the maximum moisture adsorption capacity of the adsorbing material is not reached.

To improve the energy balance in such cases the dew point of the dried air flowing out from the drying pot and being supplied to the drying container is monitored continuously for extending the adsorption period of the drying pot until the dew point approaches a tolerable limit value. Only when the limit value of the dew point is reached will the drying pot be switched to regeneration.

However, some expenses are involved in providing a dew point sensor of sufficient load tolerances. Moreover the dew point sensors are often subject to failures. Such metering sensors degrade easily and become contaminated already after a short lifetime and emit then inexact signals which prevent full utilization of the moisture adsorbing capacity of the adsorption material. Moreover, the exhaust air may assume high temperatures of approximately 60° through 80° C. when the throughput through the drying container is reduced. At these high temperatures, a molecular sieve no longer can adsorb moisture effectively. Therefore, in case of reduced moisture load of the exhaust air, a bad dew point is signalled, although the moisture adsorbing capacity of the molecular sieve is not fully utilized.

For determining the optimum length of the adsorption period U.S. Pat. No. 2,561,441 recommends scanning the temperatures of the air to be dried at the input into the adsorbing material and at the output from the adsorbing the adsorbing material during the adsorption period. A temperature difference is formed from the input temperature and the output temperature which indicates the actually adsorbed moisture at any moment. When the temperature difference decreases to a preset minimum temperature difference, the drying pot including the adsorbing material is switched to the regeneration phase. This method for switching from the adsorption period to the regeneration period operates as desired only if the moisture content of the input air remains constant in time. However, for a number of granulate drying processes the moisture content of the input air varies. Consequently, when the moisture content of the input air decreases, also the temperature difference decreases. Thereby, an erroneous indication of the saturation of the adsorbing material is obtained to the effect, that the drying pot is switched to the regeneration period although the adsorbing material is not completely utilized.

SUMMARY OF THE INVENTION

It is therefore an object of the present invention to provide an improved method for drying humid air which allows optimizing the length of the moisture adsorbing period by utilizing simple scanning methods, even if the input moisture varies, to obtain an optimum length of adsorption period. The invention provides for a method of controlling a duration of an adsorption cycle in a process of adsorbing moisture from a gas, particularly air, using an adsorbing material including the steps of passing a moisture-carrying gas and a heated regenerating medium alternatingly through the adsorbing material in a series of alternating adsorption cycles and regeneration cycles. This method consists of monitoring, during a regeneration cycle, only a decrease of weight of the adsorbing material, comparing the decrease in weight of the adsorbing material to a preset value and controlling the duration of an adsorption cycle immediately following the regeneration cycle according to the comparing.

According to a preferred embodiment of the invention the controlling includes setting the duration of the adsorbing cycle immediately following the regeneration cycle equal to the duration of the adsorption cycle immediately preceding the regeneration cycle plus a predetermined fixed period if the decrease in weight of the adsorbing material is less than the preset value. Alternatively it is preferred that the controlling includes setting the duration of the adsorption cycle immediately following the regeneration cycle equal to the duration of the adsorption cycle immediately preceding the regeneration cycle minus a predetermined fixed period if the decrease in weight of the adsorbing material is greater than the preset value.

According to another aspect the invention provides a method of controlling a duration of an adsorption cycle in a process of adsorbing moisture from a gas, particularly air, using an adsorbing material including the steps of passing a moisture-carrying gas and a heated regenerating medium alternatingly through the adsorbing material in a series of alternating adsorption cycles and regeneration cycles. This method consists of monitoring, during an adsorption cycle, only an increase of weight of the adsorbing material; comparing the increase in weight of the adsorbing material during the monitoring to a preset value; and switching to regeneration when the preset value is reached.

The advantage of the method of the invention is that it uses only one simple weight measurement for optimizing the length of the adsorption cycle. The invention also includes an apparatus for adsorbing moisture from gases, particularly air, comprising an exhaust air drier including at least one drying pot containing an adsorbing material; an exhaust conduit for feeding a moisture-carrying gas to the drying pot; an input conduit for feeding a hot regenerating medium to the drying pot; an outlet conduit for regenerating medium; means for measuring a weight dependent on the adsorbing material weight and producing an output signal according to the weight; and control means for receiving the output signal of the means for measuring the weight and for controlling a duration of the adsorption cycle by comparing it to a preselected value.

In a preferred embodiment of the apparatus of the invention the means for measuring the weight includes load cells from which the drying pot containing the adsorbing material is suspended. The load cells measure a weight of the drying pot plus the adsorbing material.

Alternatively an apparatus is preferred wherein the means for measuring the weight includes load cells on which the drying pot containing the adsorbing material rests. The load cells measure a weight of the drying pot plus the adsorbing material.

DETAILED DESCRIPTION OF A PREFERRED EMBODIMENT

Figure 1:
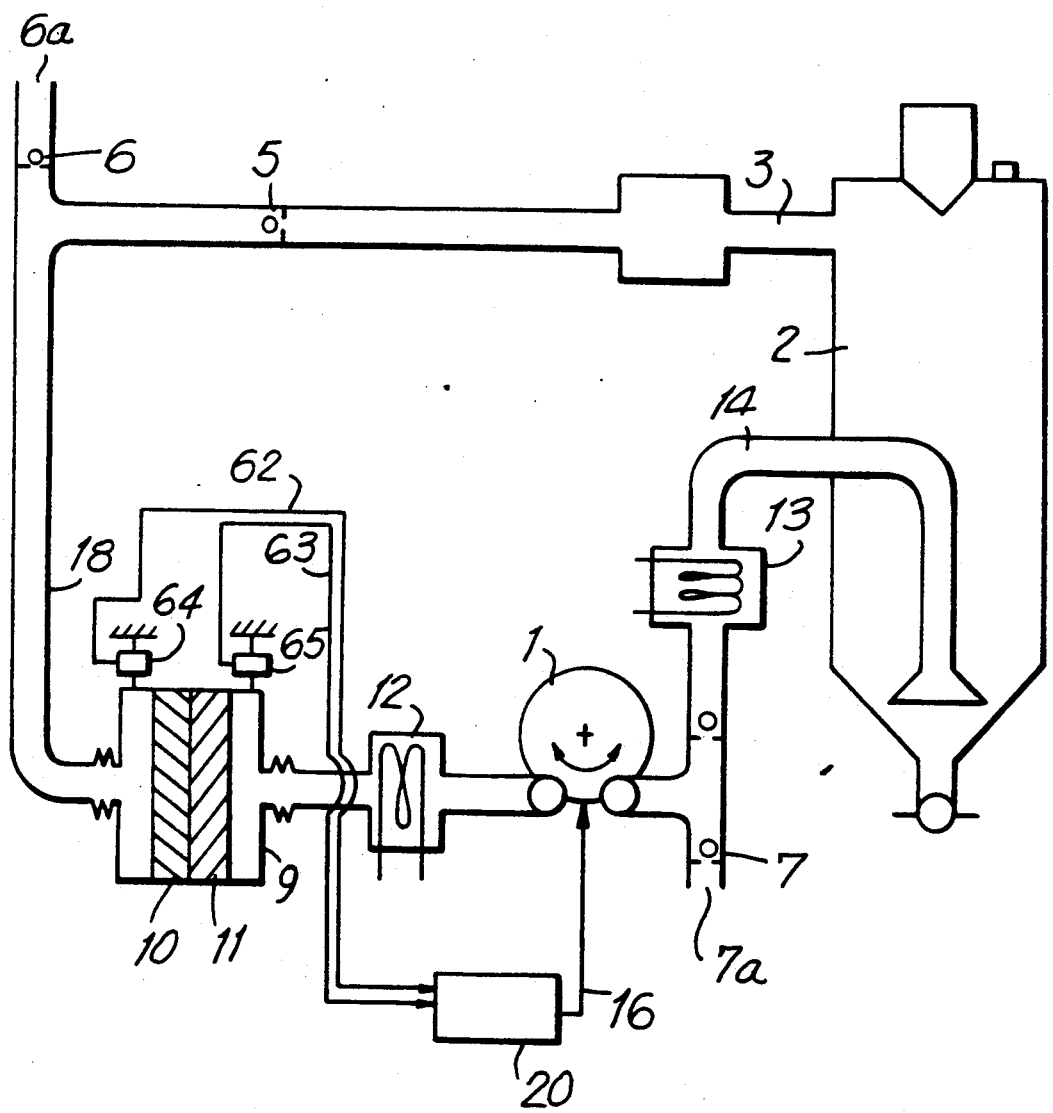
FIG. 1 is a schematic diagram of an apparatus for performing the method of the invention.
Figure 2:
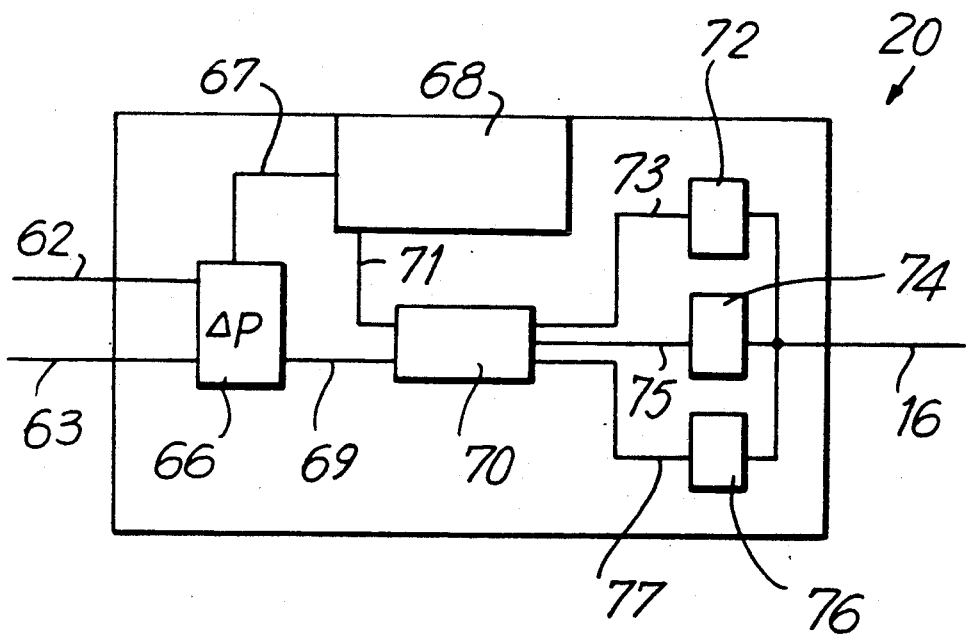
FIG. 2 is a block diagram of a control means of the apparatus of FIG. 1.

For the apparatus schematically shown in FIG. 1 reference is made to the disclosure of German Patent Specification 2,354,745, the details of which are included herein. Dried air is fed to a drying hopper 2 through an input conduit 14. The dried air penetrates in reverse flow the unshown bulk material sinking by gravity through the drying hopper 2. Humid air is drawn off from the drying hopper 2 at the upper end thereof through exhaust conduit 3. The exhaust conduit 3 opens into a drying pot 9 through a flap valve 5. The drying pot 9 includes adsorbing materials 10, 11 which may be silica gel or molecular sieve. The adsorbing materials 10, 11 remove moisture carried with the humid exhaust air. The dried air flowing out of the drying pot 9 is heated by one or both heating devices 12, 13 and is fed by a blower 1 through another flap valve 8 and through the dried air conduit 14 to the drying hopper 2. When the adsorbing materials 10,11 are saturated sufficiently by moisture the direction of rotation of the blower is reversed by a control means or controller 20, so that air from outside is drawn in through a connecting conduit 7 and another flap valve 7. The air is heated in a heating device 12 and is pressed through the drying pot 9. The humid regenerating air is exhausted into the atmosphere through another connecting conduit 6a and a flap valve 6 after the hot regenerating air has taken adsorbed water out of the adsorbing materials 10,11. The control means 20 determines the time when drying the humid exhaust from the drying hopper 2 is terminated and regeneration of the adsorption materials 10,11 is initiated. To this end pressure pickup devices 64,65 are provided from which the drying pot 9 is suspended and which monitor the reduction of weight of the drying pot 9 during regeneration. Load cells as distributed by Houston Scientific International, Inc., 4202 Directors Row, Houston, Tex. 77092, may be utilized for the pressure pick-up devices 64,65. A signal line 62 connects the output of pressure pick-up device 64 to one input of control means 20 and a signal line 63 connects the output of pressure pick-up device 65 to a second input of control means 20. Specifically in control means 20 signal lines 62 and 63 are two input lines to circuit 66 which receives another input from memory 68 through line 67. Through line 67 a signal stored in memory 68 is applied to circuit 66 which represents the weight of both dry adsorbing materials 10,11. When during a regeneration period the signals received through lines 62,63 by match the signal on line 67, circuit 66 forms the difference between each of the signals on lines 62,63 as they occur at onset of a regeneration period and the signal on line 67. A signal representing the value of that difference appears on output line 69 of circuit 66 and is applied to comparator 70 as one input therefor which receives a second input from memory 68 through line 71. The signal stored in memory 68 and applied to comparator 70 through line 71 represents the maximum quantity of water load which is desired fro obtaining a low dew point of the air dried by the adsorbing materials 10,11 during an adsorption period. If in the comparator 70 the amplitude of input signal of line 69 falls below the amplitude of the reference signal on line 71, a first output 73 of comparator is activated for initiating timer 72. If in the comparator 70 the amplitude of input signal of line 69 exceeds the amplitude of the reference signal on line 71, a third output 77 of comparator 70 is activated for initiating timer 76. If input signal of line 69 matches reference signal 71, a second output 75 of comparator 70 activates timer 74.

Each of the timers 72, 74, 76 is adapted to emit when activated a first signal to blower 1 through line 16 for reversing the direction of rotation of the blower which causes switching from the regeneration period to a following adsorption period. Similarly, each of the timers 72, 74, 76 is adapted to emit a second signal to blower 1 through line 16 when the time period of the corresponding timer has expired. The second signal causes a reversing of the rotation direction of the blower for switching from adsorption to regeneration. Importantly, the preset time interval for the first timer 72, i.e. the interval between the first and second signal, is longer, e.g. for 10 minutes, than the corresponding time interval of the second timer 74. Similarly, the time interval of the third timer 76 is shorter, e.g. for 10 minutes, than the corresponding interval of the second timer 74. Thus if the decrease in weight exceeds the reference value stored in memory 68 of control means 20, timer 76 shortens the duration of the immediately following adsorption cycle. And if the decrease in weight falls below the reference value, timer 72 is activated and extends the duration of the immediately following adsorption cycle.

EXAMPLES

A drying pot includes adsorption material in the amount of 10 kg molecular sieve. The exhaust air from a drying hopper through which plastic granulates are sinking is to be dried. With maximum load an optimum adsorption period lasts for one hour during which 1 kg water is adsorbed. The molecular sieve which can adsorb at most 20% of its weight allows for obtaining under these conditions, i.e. and adsorption of 10% of its own weight, a dew point of −30° C. of the dried air which is refed to the drying hopper.

Control Process No. 1

The increase of weight of the drying pot is measured during the adsorption cycle with an exhaust air temperature of 50° C. When the adsorbed quantity of water amounts to 1 kg switching from adsorption to regeneration of the drying pot is effected.

Control Process No. 2

The quantity of water taken up by the adsorption material is determined by weighing during the regeneration cycle. If it is found that during the regeneration cycle approximately 500 g water are taken over which means that in the preceding adsorption cycle only 500 g water are adsorbed by the adsorption material, the control doubles the time period for the succeeding adsorption cycle for the drying pot.

Control Process No. 3

If it is found that during the regeneration cycle a quantity of water less than 1 kg has been removed, the succeeding adsorption period is extended for a fixed period, e.g. for 10 minutes. This stepwise extension of the period of the succeeding adsorption cycles is effected until it is determined that during the regeneration 1 kg water has been removed. In case this quantity of water is exceeded, the following adsorption cycle is shortened for 10 minutes. In this way the changeover of adsorption and regeneration yields an optimum adsorption period during which the adsorbing capacity of the adsorbing material is practically completely utilized.

While the invention has been illustrated and described as embodied in a method and apparatus for adsorbing moisture from gases, especially air, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. A method of controlling a duration of an adsorption cycle in a process of adsorbing moisture from a gas, particularly air, using an adsorbing material including the steps of passing a moisture-carrying gas and a heated regenerating medium alternatingly through the adsorbing material in a series of alternating adsorption cycles and regeneration cycles, said method consisting of monitoring, during a regeneration cycle, only a decrease of weight of the adsorbing material; comparing the decrease in weight of the adsorbing material to a preset value; and controlling the duration of an adsorption cycle immediately following the regeneration cycle according to said comparing.

2. A method of controlling a duration of an adsorption cycle in a process of adsorbing moisture from a gas, particularly air, using an adsorbing material including the steps of passing a moisture-carrying gas and a heated regenerating medium alternatingly through the adsorbing material in a series of alternating adsorption cycles and regeneration cycles, said method consisting of monitoring, during an adsorption cycle, only an increase of weight of the adsorbing material; comparing the increase in weight of the adsorbing material during the monitoring to a preset value; and switching to regeneration when the preset value is reached.

3. Method as defined in claim 1, wherein said controlling includes setting the duration of the adsorption cycle immediately following the regeneration cycle equal to the duration of the adsorption cycle immediately preceding the regeneration cycle plus a predetermined fixed period if the decrease in weight of the adsorbing material is less than the preset value.

4. Method as defined in claim 1, wherein said controlling includes setting the duration of the adsorption cycle immediately following the regeneration cycle equal to the duration of the adsorption cycle immediately preceding the regeneration cycle minus a predetermined fixed period if the decrease in weight of the adsorbing material is greater than the preset value.

5. An apparatus for adsorbing moisture from gases, particularly air, comprising an exhaust air drier including at least one drying pot containing an adsorbing material; an exhaust conduit for feeding a moisture-carrying gas to the drying pot; an input conduit for feeding a hot regenerating medium to the drying pot; an outlet conduit for regenerating medium; means for measuring a weight dependent on the adsorbing material weight and producing an output signal according to the weight; and control means for receiving the output signal of the means for measuring the weight and for controlling a duration of an adsorption cycle of a plurality of successive alternating adsorption and regeneration cycles by comparing the output signal to a preset value.

6. An apparatus as defined in claim 5, wherein said means for measuring the weight includes load cells from which the drying pot containing the adsorbing material are suspended, said load cells measuring a weight of the drying pot plus the adsorbing material.

7. An apparatus as defined in claim 5, wherein said means for measuring the weight includes load cells upon which the drying pot containing the adsorbing material rest, said load cells measuring a weight of the drying pot plus the adsorbing material.

8. An apparatus as defined in claim 7, wherein said control means includes circuit means connected to said load cells to receive the output signal from said load cells, memory means for storing a preset value of said output signal corresponding to a maximum quantity of water in said adsorbing material, comparator means for comparing the output signal received by the circuit means with the present value stored in the memory means and three timing means connected with said comparator means, each of said timing means producing a first switching signal for switching said drying pot from one of the regeneration cycles to the immediately following adsorption cycle and a second switching signal for switching said drying pot from the immediately following adsorption cycle to the next following regeneration cycle, a time interval between said first and second switching signals of said second switching means being always greater than a corresponding time interval of said first switching means and less than a corresponding time interval of said third switching means, said comparator means connected to said timing means acting to select said timing means used to produce said first and second switching signals.

* * * * *